United States Patent [19]
Shi et al.

[11] Patent Number: 5,658,022
[45] Date of Patent: Aug. 19, 1997

[54] PIPE CONNECTOR IMPROVEMENT STRUCTURE

[76] Inventors: Wu-Huan Shi, 12, Alley 2, Lane 156, Chung Cheng Rd, Fu Hsing County, Changhua; Yi-Chang Tung, 93, Yuan An 2 Rd, Lu Kang Town, Changhua, both of Taiwan

[21] Appl. No.: 508,304

[22] Filed: Jul. 27, 1995

[51] Int. Cl.$^6$ .................................. F16L 25/00
[52] U.S. Cl. .......................... 285/148.23; 285/261
[58] Field of Search .......................... 285/261, 271, 285/177

[56] References Cited

U.S. PATENT DOCUMENTS

| | | | |
|---|---|---|---|
| 290,196 | 12/1883 | Abel | 285/261 X |
| 747,152 | 12/1903 | Draper | 285/271 X |
| 1,568,649 | 1/1926 | Woodruff | 285/271 X |
| 1,914,736 | 6/1933 | Coutu | 285/271 X |
| 2,215,339 | 9/1940 | Urban | 285/271 X |
| 3,361,450 | 1/1968 | Franck | 285/271 |
| 3,712,645 | 1/1973 | Herter | 285/261 X |
| 5,290,075 | 3/1994 | Allread | 285/261 |

FOREIGN PATENT DOCUMENTS 219691  10/1925  United Kingdom ................ 285/261

Primary Examiner—Dave W. Arola
Attorney, Agent, or Firm—Beveridge, DeGrandi, Weilacher & Young, L.L.P.

[57] ABSTRACT

This is a pipe connector improvement structure. Which consists a penetrated connector with extended stem, a rotator, two sealing rings, a socket and are assembled together by a nut. The rotator is a sphere drilled through by a hole. Sealing rings are circular ring shape. The socket has a concave spherical surface in the front end, also has two sections of thread on the outer surface. The nut has inner thread with a smaller radius arc holding surface in the front end. With all listed above components assembled together will facilitate free rotation and bending of the pipe connector.

6 Claims, 2 Drawing Sheets

PRIOR ART
FIG.1-A

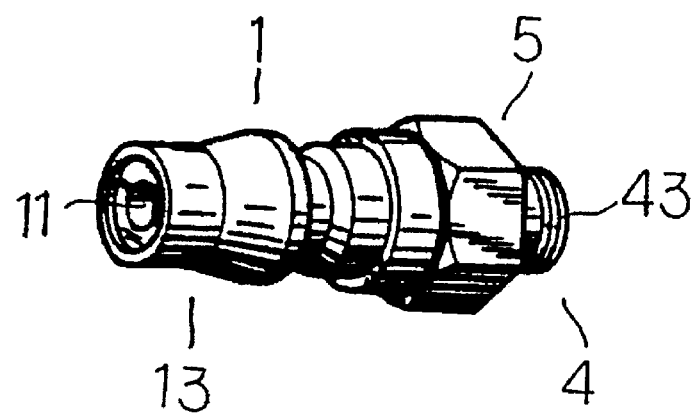
F I G. 3
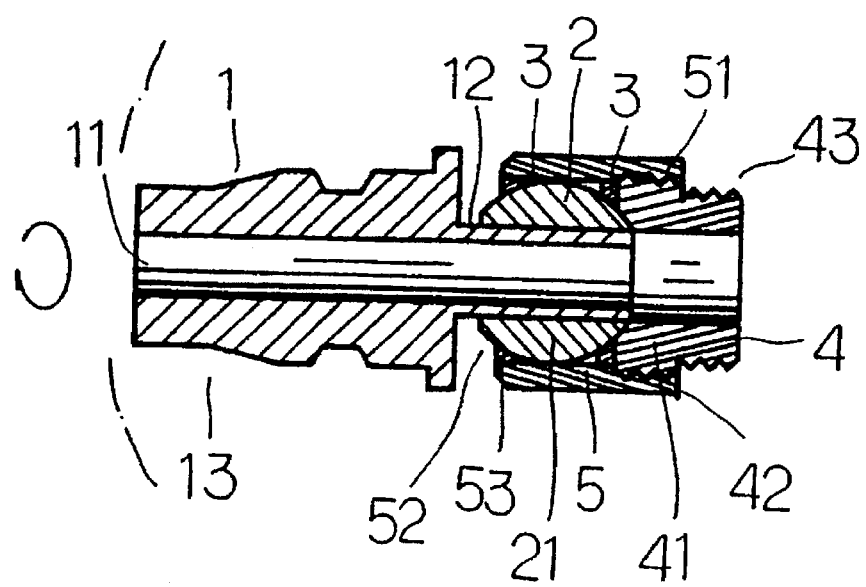
F I G. 4

5,658,022

PIPE CONNECTOR IMPROVEMENT STRUCTURE

BACKGROUND OF THE INFORMATION

The present invention is an improved pipe connector structure, which consists of a hollow stem located on a pipe connector end, a rotator, two sealing rings, and a socket assembled, together by a nut. After assembly the pipe connector improvement structure can bend and rotate freely.

The conventional pipe connector is made by lathe and is illustrated in FIG. 1 and FIG. 1-A. The conventional pipe connector is a hexagonal body A with one end A1 threaded, another end is a multiple ring hose end A2, and the body A has a hole drilled through it A3. The outer thread is used to fix the pipe connector onto a pipe, and pipe hose end is to engage a hose. This kind of pipe connector can neither bend nor rotate, which will cause the hose to extend out some distance, sometimes contacting other objects in a narrow space, thus restricting the flow in the hose or causing the hose to interfere with other objects. This stimulates the intention to modify the conventional pipe connector.

SUMMARY OF THE INVENTION

The present invention has been developed to provide an improved pipe connector structure. A multiple ring type hose end with an extended stem, a rotator, two sealing rings, and a socket, are assembled together by a nut. The hose ended connector with connecting stem on the other end is hollow. The rotator is a sphere with a hole therethrough. The sealing rings are circular ring type. The socket has a concave spherical surface to accept the rotator and the outer surface of the socket has two sections of thread. The nut is inner threaded, and has a seating surface in the front end. The seating surface has a smaller radius arc section and is used to facilitate the free bending and rotation of pipe connector improvement structure.

BRIEF DESCRIPTION OF THE DRAWINGS

The present invention will now be described by way of example with reference to the drawings, in which:

FIG. 1A. is a sectional view of the pipe connector shown in FIG. 1.

FIG. 3. is an exploded view drawing of the present invention.

FIG. 4. is a sectional view of the present invention.

DETAILED DESCRIPTION OF THE PREFERRED EMBODIMENT

Figure 1:
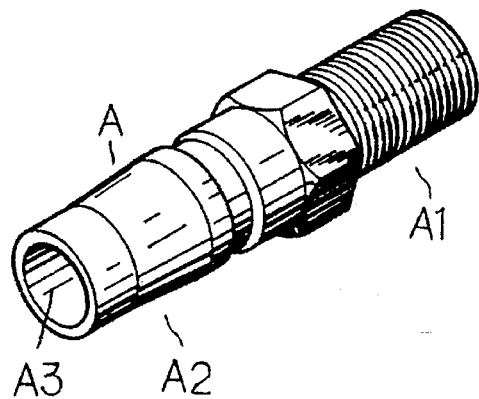
FIG. 1. is a elevational view of a pipe connector according to the prior art.
Figure 2:
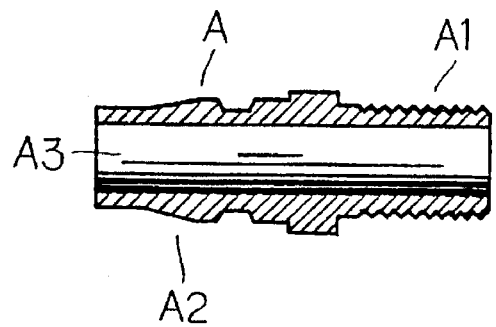
FIG. 2. is a sectional view of conventional pipe connector.
Figure 2:
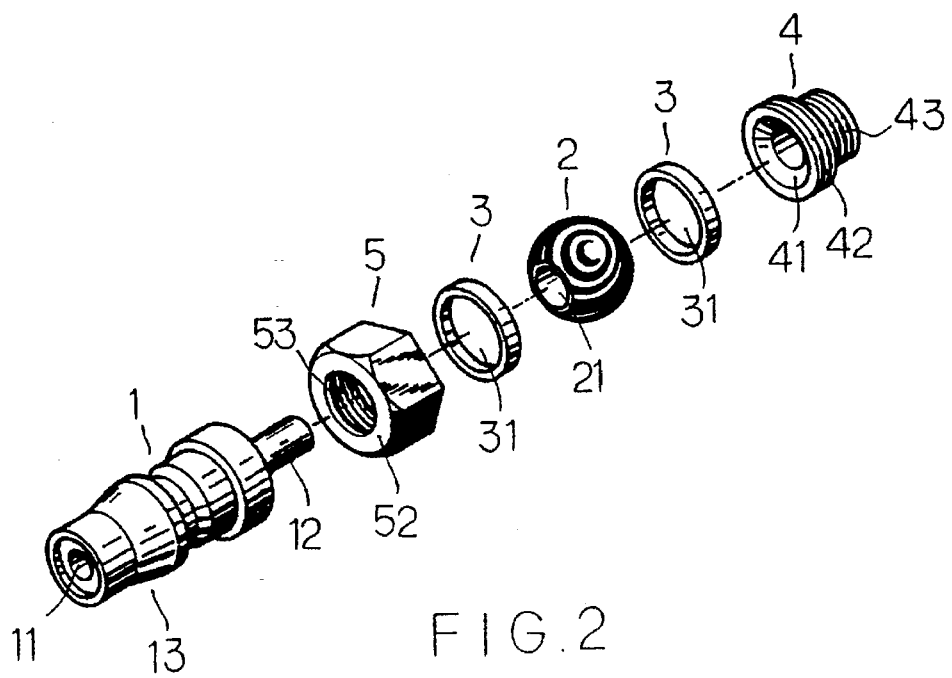

Referring to FIG. 2 and FIG. 3, a pipe connector according to the present invention is illustrated. This pipe connector contains a connector 1 with rotator 2 engaged on its extended stem, two sealing rings 3, socket 4 and nut 5 which are assembled together.

A connector 1 with and extended stem 12 on one end and a multiple ring type hose end 13 on the other end, has a hole 11 drilled through it.

A rotator 2 is a sphere with a by hole 21 drilled therethrough, rotator 2 for engagement with extended stem 12 of connector 1.

Two sealing rings 3, which are circular ring shape 31, will be used for allowing the rotation of rotator 2.

A socket 4, has a concave spherical surface 41, in the front end, to install a sealing ring 3 and to receive rotator 2, and the outer surface of socket 4 has two sections of threads 42, 43 to facilitate fixture with other pipe components.

A nut 5, installed between connector 1 and the extended stem 12 and rotator 2 connection, has an inner thread 51 for engaging thread 42 of socket 4 located on the outer surface of concave spherical surface 41. Also, there is a seating surface 52 inside the front end of nut having a smaller radius 53 arc or recessed section.

Referring to FIG. 4, the connector 1 and rotator 2 are assembled into a unit, using rotator 2 as a joint, by this way connector 1 can rotate or bend freely, thus wilt improve conventional pipe connector deficiencies.

What is claimed is:

1. A pipe connecting structure, comprising:

a socket having a receiving end and an outer periphery, at least a part of said outer periphery of said receiving end being threaded;

a nut having a first end, a second end, and an inner periphery, said inner periphery of said first end of said nut being threaded and rotatingly engaging said threaded outer periphery of said socket and said second end having a seating surface and a recessed section;

a spherical rotator which is positioned within said nut and has an opening extending therethrough, and said spherical rotator having an external diameter essentially the same as said inner periphery of said nut;

a first sealing ring positioned between and in sealing engagement with said receiving end of said socket and said spherical rotator, said first sealing ring having an outer diameter essentially the same as said inner periphery of said nut;

a second sealing ring positioned within said recessed section located adjacent said seating surface and radially between and in sealing engagement with said nut and said spherical rotator; and a connector having an extended stem, said connector and said extended stem each having a hollow chamber which are in communication, and said extended stem being fixedly engaged with a surface defining the opening in said spherical rotator.

2. A pipe connecting structure as defined in claim 1, wherein the receiving end of said socket is concave in shape for receipt of a portion of said spherical rotator.

3. A pipe connecting structure as defined in claim 2, wherein a portion of said spherical rotator extends out of said second end of said nut to increase a range of movement of said connector.

4. A pipe connecting structure as defined in claim 2, wherein said outer periphery of said socket includes two different diameter threaded sections.

5. A pipe connecting structure, comprising:

a socket having a receiving end and an outer periphery, at least part of said outer periphery of said receiving end being threaded and a face of said receiving end being concave and imperforate;

a nut having a first end, a second end, and an inner periphery, said inner periphery of said first end of said nut being threaded and rotatingly engaging said threaded outer periphery of said socket and said second end having a seating surface and a recessed section;

a spherical rotator having an opening therethrough and being received within the seating surface in said nut and engaging said concave face;

a first sealing ring positioned between and in sealing engagement with said receiving end of said socket and said spherical rotator;

a second sealing ring positioned within said recessed section radially between and in sealing engagement with said nut and said spherical rotator; and a connector having an extended stem, said connector and said extended stem each having a hollow chamber which are in communication and said extended stem being fixedly engaged with a surface defining the opening in said spherical rotator.

6. A pipe connecting structure, comprising:

a socket having a receiving end and an outer periphery, at least part of said outer periphery of said receiving end being threaded and a face of said receiving end being concave;

a nut having a first end, a second end, and an inner periphery therebetween, said inner periphery of said nut having a substantially constant diameter, a portion of said inner periphery proximal to said threaded first end of said nut being threaded and rotatably engaging said outer periphery of said socket and said second end having a seating surface and a recessed section;

a spherical rotator, having an opening therethrough, received within said seating surface in said nut and contacting said face of said socket, said spherical rotator having an external diameter essentially the same as said inner periphery of said nut;

a first sealing ring positioned between and in sealing engagement with said receiving end of said socket and said spherical rotator;

a second sealing ring positioned within said recessed section radially between and in sealing engagement with said nut and said spherical rotator; and a connector having an extended stem, said connector and said extended stem each having a hollow chamber which are in communication and said extended stem being fixedly engaged with a surface defining the opening in said spherical rotator.

* * * * *